(12) United States Patent
Wang et al.

(10) Patent No.: US 6,239,951 B1
(45) Date of Patent: May 29, 2001

(54) AIR BEARING SLIDER WITH INCREASED SPEED SENSITIVITY

(75) Inventors: Ling Wang, Eden Prairie; Zuxuan Lin, St. Paul; Li Li, Bloomington, all of MN (US)

(73) Assignee: Seagate Technology, LLC, Scotts Valley, CA (US)

(*) Notice: Subject to any disclaimer, the term of this patent is extended or adjusted under 35 U.S.C. 154(b) by 0 days.

(21) Appl. No.: 09/061,442

(22) Filed: Apr. 16, 1998

Related U.S. Application Data

(60) Provisional application No. 60/059,468, filed on Sep. 22, 1997.

(51) Int. Cl.$^7$ .................................................. G11B 5/60
(52) U.S. Cl. ........................... 360/236.8; 360/236.9; 360/236.5; 73/105
(58) Field of Search ............... 360/103, 235.4–237.1; 73/105

(56) References Cited

U.S. PATENT DOCUMENTS

| | | | |
|---|---|---|---|
| 3,823,416 | * 7/1974 | Warner | 360/103 |
| 5,196,974 | * 3/1993 | Higashiya et al. | 360/103 |
| 5,287,235 | * 2/1994 | Cunningham et al. | 360/103 |
| 5,343,343 | 8/1994 | Chapin | 360/103 |
| 5,430,591 | * 7/1995 | Takeuchi et al. | 360/103 |
| 5,515,219 | * 5/1996 | Ihrke et al. | 360/103 |
| 5,568,981 | * 10/1996 | Nepela et al. | 384/12 |
| 5,685,645 | * 11/1997 | Nepela et al. | 384/12 |
| 5,737,151 | * 4/1998 | Bolasna et al. | 360/103 |
| 5,739,981 | * 4/1998 | Cha et al. | 360/103 |
| 5,768,053 | * 6/1998 | Yamanaka et al. | 360/103 |
| 5,825,588 | * 10/1998 | Bolasna et al. | 360/103 |
| 5,872,311 | * 2/1999 | Schaenzer et al. | 73/105 |
| 5,889,637 | * 3/1999 | Chang et al. | 360/103 |
| 5,963,396 | * 10/1999 | Burga et al. | 360/103 |
| 5,973,880 | * 10/1999 | Hashimoto et al. | 360/103 |
| 6,023,963 | * 2/2000 | Schaenzer et al. | 73/105 |

FOREIGN PATENT DOCUMENTS

| | | |
|---|---|---|
| 3-59859 | * 3/1991 | (JP). |
| 9-198635 | * 7/1997 | (JP). |

OTHER PUBLICATIONS

IEEE Transactions on Magnetics, "Air Bearing Design Considerations for Constant Fly Height Applications"; Chhabra et al; vol. 30, No. 2, Mar. 1994; pp. 417–423.*

1996 Phase Metrics Corporation. MC900–T3 Unified Cycle Production; Burnish/Glide/Certifier; Burnish/Glide Operation Manual; Part No. 980059000; Rev.A, Jun. 28, 1996.

* cited by examiner

Primary Examiner—Brian E. Miller
(74) Attorney, Agent, or Firm—Kinney & Lange, P.A.

(57) ABSTRACT

An air bearing slider has an air bearing surface with two rails separated by a cavity. The rails are nonsymmetrical about the longitudinal axis. Instead, the width of the active rail is greater at the trailing end than at the leading end, such as by having a hook portion 64 which extends inward at a sharp angle to the longitudinal axis of the slider. The wider hook portion 64 causes an increased flying height sensitivity to underlying disc/wind speed. The nonactive rail has a greater width than the non-hook portion of the active rail, so the slider exhibits slight negative roll. A vibration sensor is attached to the air bearing slider, and the air bearing slider is used in glide testing of discs.

17 Claims, 7 Drawing Sheets

AIR BEARING SLIDER WITH INCREASED SPEED SENSITIVITY

CROSS-REFERENCE TO RELATED APPLICATION(S)

This application claims the benefit of Provisional Application No. 60/059,468 filed on Sep. 22, 1997, entitled SPEED SENSITIVE GLIDER AIR CONFIGURATION—HOCKEY AAB.

BACKGROUND OF THE INVENTION

The present invention relates to air bearing sliders, and more particularly to air bearing sliders used in production glide testing of discs for disc drives.

Many systems use structures which are required to have a substantially flat surface. In particular, many disc drives use air bearing sliders to support a transducer, such as a magnetic read/write head, over the media disc surface. The air bearing slider rides on an extremely thin layer of air or "wind" which "sticks" to and travels with the rotating disc. For proper operation of the air bearing slider and read/write head, the disc surface over which the air bearing slider travels must be substantially flat.

With improvements to disc fabrication techniques, increasingly flat surfaces are possible. Nonetheless, current economical disc fabrication techniques do not provide discs that are sufficiently flat in all instances. Microscopic bumps or asperities remain on the disc surface after fabrication. If an asperity is large enough, it can cause read/write head to disc contact during operation of the disc drive. The read/write head to disc contact results at a minimum in degraded disc drive performance such as data loss and, if sufficiently severe, results in a fatal disc drive failure or "crash". Due to various reasons, even asperities which are smaller than the nominal read/write head fly height may still cause similar problems degrading disc drive performance.

The read accuracy and recorded density of a read/write head generally improves with lower fly height. It is accordingly continually desired to position read/write heads closer to disc or media surfaces. Fly heights as low as 0.7 micro inches (180 Å) may be possible. As the distance between the slider and the disc becomes smaller, disc surface tribology becomes more critical to slider aerodynamics and performance.

In typical disc drives, the disc is rotated during use at a uniform rotation speed or angular velocity, regardless of the radial position of the slider. The slider is moved between different radial tracks to read and write data to different locations on the disc. For maximum accuracy of recording, it is desired that the air bearing slider maintain a selected uniform flying height at all radii of the disc. Different radii of the disc correspond to different wind velocities or linear disc speeds in circumferential inches per second. Most air bearing sliders for use in disc drives are intended to be relatively insensitive to variations in wind speed, so as to fly at the same flying height at an outer radius as at an inner radius.

Much effort has gone into the design of air bearing sliders to improve flight characteristics. For instance, many slider designs include an inside rail and an outside rail separated by a central cavity. One slider design, known as a "catamaran" slider, includes two rails of constant width separated by a cavity of near ambient pressure. The rails generate a positive pressure lift force for the slider. One of the rails may ride lower than the other or have the active transducer positioned thereon, and thus be an "active" rail of the slider. Some air bearing sliders include a cross rail or crossbar which forms a large air expansion region of generally negative pressure. The magnitude of the negative pressure increases at the greater wind velocities present at outer radii, offsetting an increase in the positive pressure lift force of the rails, and thus the crossbar aids in making the slider relatively insensitive to wind speed.

Additionally, prior disc drives can be categorized according to the type of actuation—rotary actuated and linearly actuated. Rotary actuated sliders are carried on an actuator arm which pivots about a fixed actuator arm pivot point, causing the slider to access across the surface of the disc in an arc. With a rotary actuated head, a "skew" angle (i.e., the angle between the longitudinal axis of the slider and a tangent to the track) changes as a function of the slider's radial position on the disc. Much design work has been directed at maintaining constant flying performance despite changing skew angles. Linearly actuated heads access radially inward and outward on the disc in a line rather than in an arc. With a linearly actuated slider, the skew angle is maintained constant at all radii, such as 0°.

To ensure that only discs having a sufficiently flat surfaces are used in production disc drives, discs are production tested in a quality control procedure prior to installation in a disc drive. The smoothness testing is performed with a "glide test", which involves flying an air bearing "glide" slider over the disc. The glide slider includes a piezo-electric element or other vibration sensor, which may be bonded on the back of the air bearing slider. The vibration sensor detects head-disc interferences or hits. Each instance of vibration is sensed and recorded for either remedial action or toward rejection of the disc. Vibration may be caused by bumps which decrease the clearance of the slider. If a bump is sufficiently large to create eddy currents and swirls in the air stream which cause the glide slider to vibrate, then the bump is recorded as a defect. The glide slider typically flies at a height lower than the read/write head during normal conditions in order to ensure that any asperity high enough to contact the read/write head will be detected.

Prior to the glide test, a cycle of burnish is performed to remove larger defects or hard particles. If defects are found during the glide test, another burnish process may be performed to remove the asperity. The glide test may then be performed again, to ensure that the asperity was removed. If the burnish process is unsuccessful, the disc may be rejected as not meeting the quality standard required for the production disc drive. Production glide/burnish testing of discs is a time consuming and expensive process, but is necessary for high quality control standards of disc drive products.

Burnish/glide testers are commercially provided such as MC900-T3 by Phase Metrics Corporation of Fremont, Calif. This glide testing is performed with a catamaran type air bearing slider, having rail widths of 11 to 12 mils and flying heights of 1.1–1.7 micro inches with a type 2 suspension 9.5 gram load and a speed from 400 ips to 600 ips. In the burnish/glide tester, the rotational speed of the disc is changed inversely proportional to the radius being accessed by the slider, so that the slider sees a uniform wind velocity despite changing radial locations along the disc.

The glide testing track width, i.e., the incremental difference in radial location of the glide head from rotation to rotation, is about 2 to 3 mils. With a 12 mil active rail width and a 3 mil glide testing track width, the active rail will pass over each defect a minimum of a four times.

BRIEF SUMMARY OF THE INVENTION

The present invention is an air bearing slider having increased flying height sensitivity to underlying disc/wind speed. The air bearing surface of the air bearing slider has two rails separated by a cavity. The width of the active rail is greater at the trailing end than at the leading end, such as by having a hook portion which extends inward at an angle to the center of the slider. In one aspect, the air bearing slider has a vibration sensor attached thereto and is used in glide testing of discs.

DETAILED DESCRIPTION OF THE PREFERRED EMBODIMENTS

Figure 1:
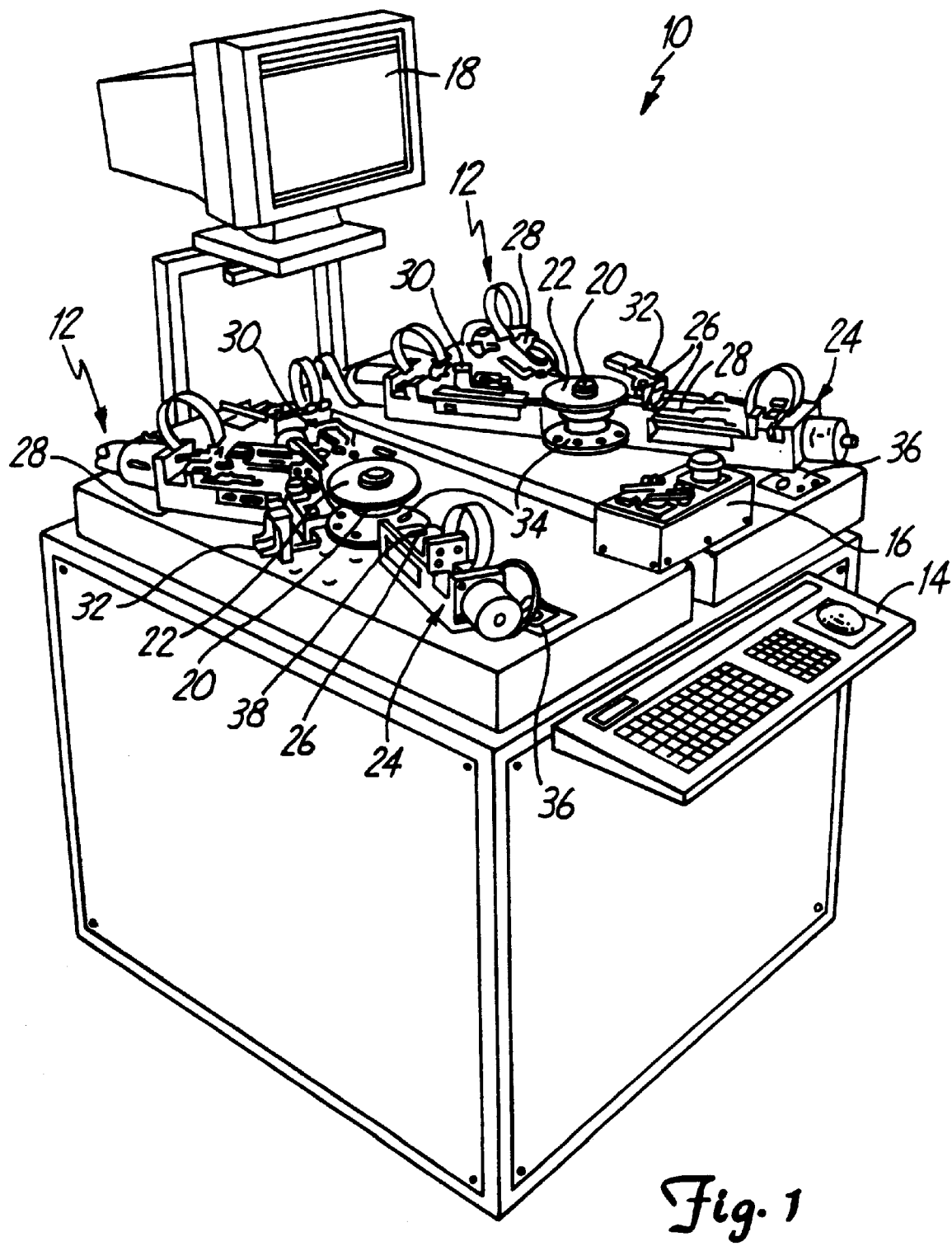
FIG. 1 is a perspective view of a burnish/glide tester.

FIG. 1 shows a test stand 10 of a burnish/glide tester in which the present invention may be used. The test stand 10 includes two test stations 12 which may be simultaneously operated such as on an alternating basis to maximize throughput of discs by a single operator. The test stand 10 includes a keyboard 14 and a control box 16 to control the tests being performed, and a display screen 18 to display testing parameters and results. A printer (not shown) may optionally be included to print out test parameters and results.

Each test station 12 includes a spindle 20, and a disc 22 is shown mounted on each spindle 20 for testing. Each spindle 20 includes a motor which rotates the spindle 20 at a selected rotational speed within a range determined by the motor design. For instance, the spindle 20 may be programmable to rotate at any speed selected between 200 and 10000 rpm.

The burnish/glide machinery is positioned around the spindle 20 for access to the top and bottom sides of the disc 22. For instance, the burnish/glide test machinery may include one or more glide head positioner assemblies 24. Each glide head positioner assembly 24 supports two sliders 26, one for each side of the disc 22. The burnish/glide tester preferably provides an index so the circumferential position of the disc 22 relative to the glide head positioner assembly 20 and sliders 26 at any given time is known. For instance, the spindle 20 may include a circumferential position sensor, or feedback may be taken from the disc 22 to monitor circumferential position. The burnish/glide machinery may also include other components, such as a burnish head positioner assembly 28, a sweep assembly 30, a bulk erase unit 32, a disc-in-place sensor 34, and associated electronics 36.

The glide head positioner assembly 24 includes a linearly moveable actuator arm 38 for each slider 26, with the air bearing slider 26 suspended at the end of each actuator arm 38. Because the slider 26 is linearly actuated, it accesses radially inward and outward on the disc 22 in a line (rather than in arc) and maintains a constant skew angle of 0° at all radii. The burnish/glide tester preferably provides an index so the radial position of the slider 26 relative to the disc 22 at any given time is known. For instance, the glide head positioner assembly 24 may include a radial position sensor, or feedback may be taken from the disc 22 to monitor radial or track position.

The speed of rotation of the spindle 20 is controlled by the test stand 10. For some testing operations, the rotational speed of the spindle 20 may be held constant (for example at 3600 rpm), similar to the rotational speed of the spindle in an actual disc drive. In other testing operations, the rotational speed spindle 20 may be varied inversely proportional to the radius at which the glide slider 26 is positioned at any given time. This provides a uniform wind velocity as seen by the slider 26, despite the fact that the slider 26 is accessing and changing radial locations along the disc 22. For a spindle programmable over a 200 to 10000 rpm range, and given a disc minimum flying radius of 650 mils and a disc maximum flying radius of 1850 mils, the wind velocity may be uniformly selected at any value from about 40 ips to about 680 ips. To maintain smoothest operation of the spindle 20, it is generally desired to avoid the edges of this range. To reduce the time of testing, it is desired to use generally only higher wind speeds. For instance, constant spindle or wind speeds selected anywhere in the 400 to 600 ips range may work well for glide testing.

Figure 2:
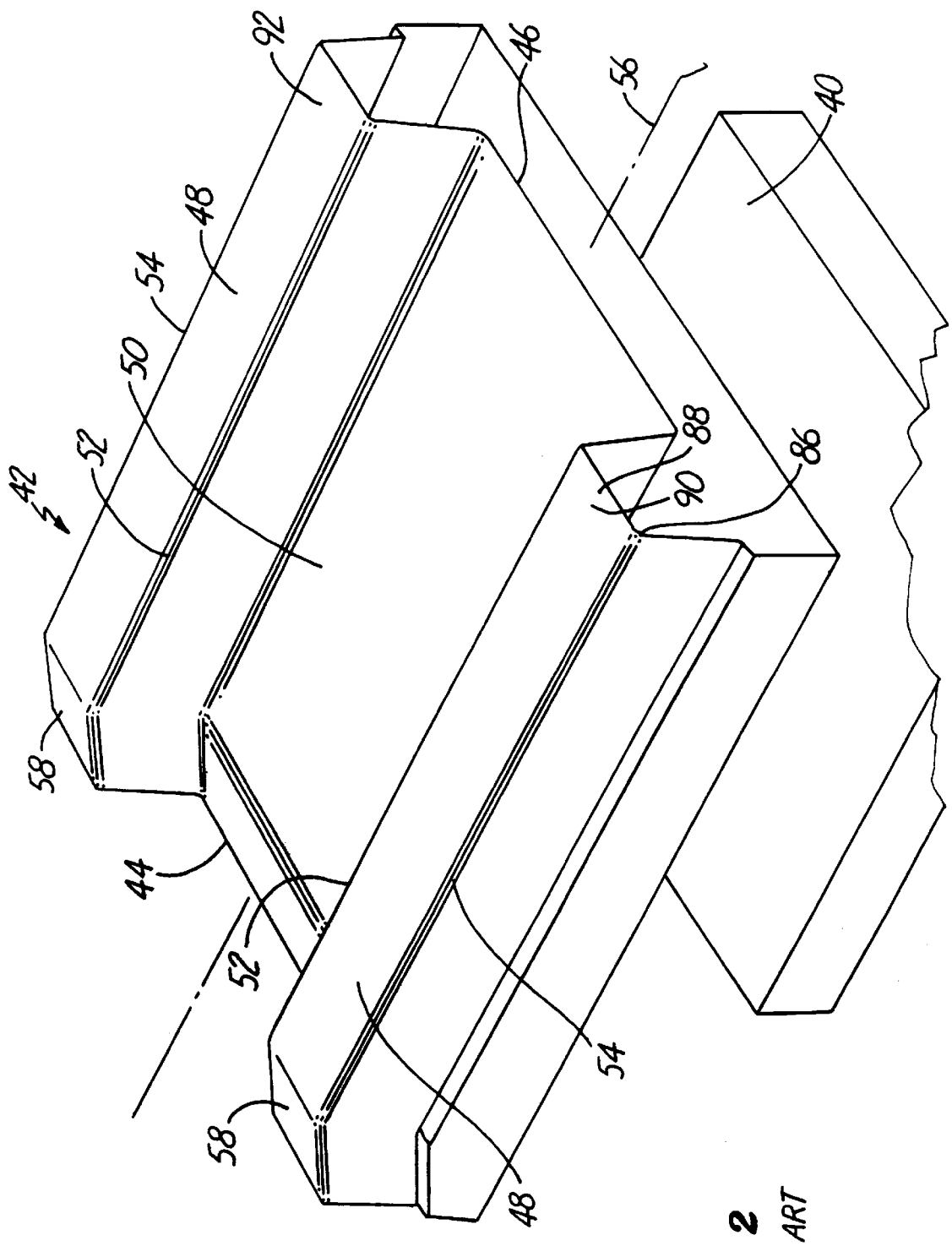
FIG. 2 is a perspective view of a prior art air bearing slider for use in glide testing.
Figure 3:
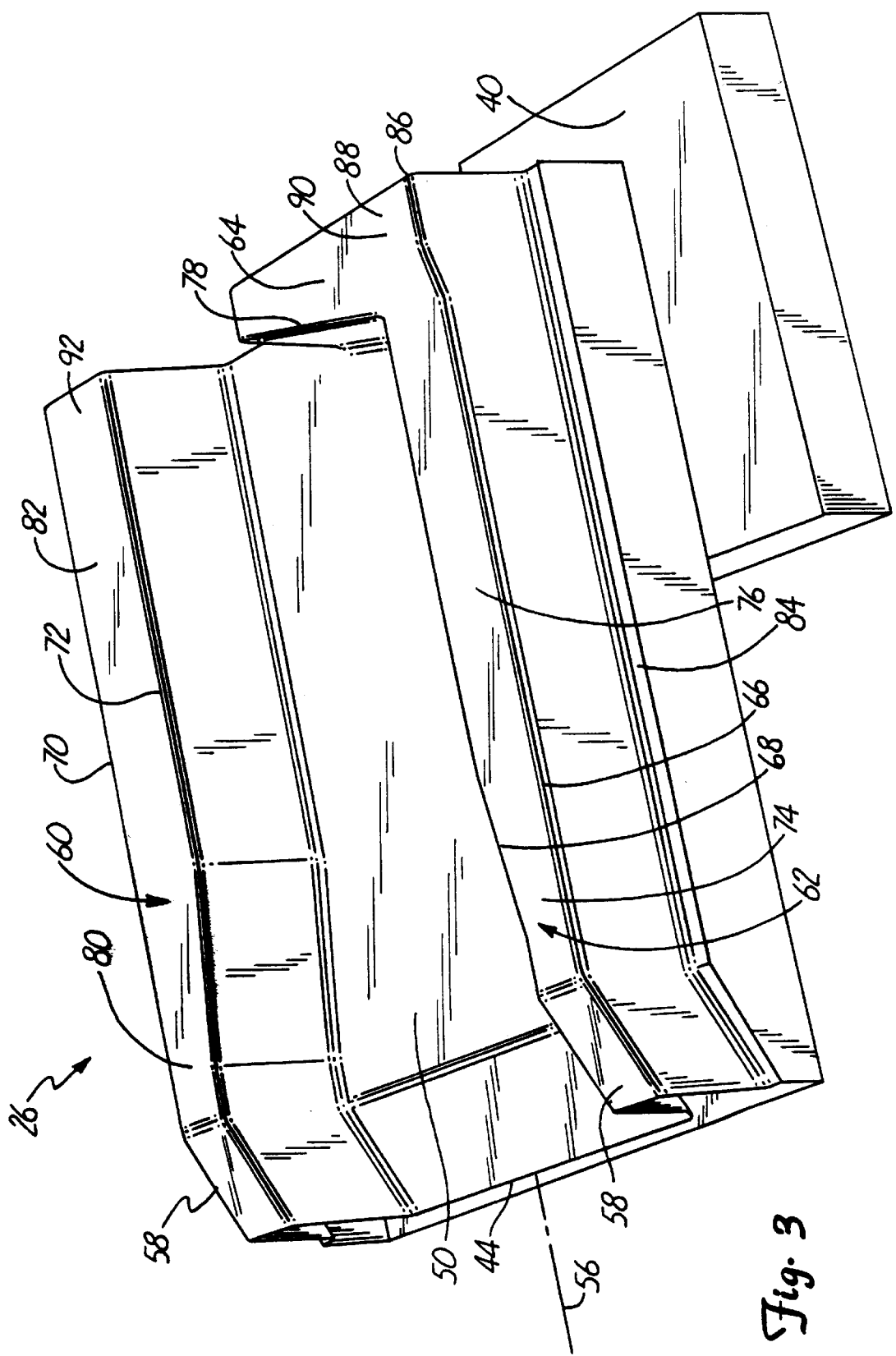
FIG. 3 is a perspective view of an air bearing slider according to the present invention.

The glide slider 26 includes a vibration sensor 40 schematically shown in FIGS. 2 and 3. The vibration sensor 40 can be of any type known in the art, but should be as small as practicable to sense vibration without affecting flying performance of the glide slider 26. For instance, the vibration sensor 40 may include a piezo-electric element ("PZT") with electrical leads (not shown), and the electric signal across the leads may vary upon vibration of the PZT element. Alternatively, the vibration sensor 40 can be a read head which generates an electrical signal which varies as a function of flying height, i.e., varies as a function of the distance between the glide slider 26 and the underlying disc surface, or a thermal sensor which senses increased heating of the glide slider 26 caused by contact with asperties. Further discussion of sensors 40 for use in the present invention is provided in application Ser. No. 08/839,992 for "Integrated Piezoelectric and Thermal Asperity Transducers For Testing Disc Media In High Performance Disc Drives" filed Apr. 24, 1997 now issued as U.S. Pat. No. 5,872,311, and application Ser. No. 08/966,313 for "Single-Sided Sensor for Glide Height Testing" filed Nov. 7, 1997, now issued as U.S. Pat. No. 6,023,963, both assigned to the assignee of the present invention and both incorporated herein by reference. The vibration sensor 40 is preferably mounted on the back of the slider 26 and toward the trailing edge of the slider 26 and adjacent the active rail.

The vibration sensor 40 detects vibrations caused by "head-disc interferences" or "hits". Hits can be head to disc contacts caused by relatively large bumps, and can also be caused by smaller bumps. If a bump is sufficiently large to create eddy currents and swirls in the air stream which cause the glide slider 26 to vibrate, then the vibration is detected by the vibration sensor 40. Each instance of sensed vibration is recorded as a defect. The glide/burnish tester maps the radial and circumferential location of each defect for either subsequent remedial action or toward rejection of the disc 22.

FIG. 2 shows a prior art catamaran slider 42 used for glide testing, disc opposing face up. Depth on the disc opposing face is considerably exaggerated in FIG. 2 to show detail. The catamaran slider 42 includes a leading edge 44 and a trailing edge 46. Two rails 48 run longitudinally between the leading edge 44 and the trailing edge 46, with a central cavity 50 defined between the rails 48. Both rails 48 have an interior or inside edge 52 and an exterior or outside edge 54 which are longitudinally constant, and the slider 42 is symmetrical about a central longitudinal axis 56. Each rail 48 has a constant width, such as about 11 to 12 mils (280 to 305 microns). A taper 58 is defined at the leading edge 44 of the rails 48, to help pressurize the air bearing surface of the rails 48.

The central cavity 50 may have a depth such as 4.8 microns (0.2 mils) relative to the air bearing surface of the rails 48. There is no cross rail on the catamaran slider 42, so the cavity 50 will have a near-ambient pressure during flying. Without a cross rail, the slider 44 will generally exhibit some sensitivity of fly height to wind/disc velocity.

The active rail will typically be the outside rail 48 of the slider 42, i.e., the rail 48 which is at a greater radius on the disc 22. Either the left rail 48 or the right rail 48 can be the outside and active rail of the slider 42, depending on how the slider is mounted relative to the disc 22. Because the slider 42 is mounted in all instances with the leading edge 44 forward, which rail 48 is active will depend on whether the disc spindle 20 rotates in a clockwise or counterclockwise direction. If this design of catamaran slider 42 is simultaneously used on both sides of a disc 22, then the left rail 48 will be the active rail on one side of the disc 22 while the right rail 48 is the active rail on the opposite side of the disc 22.

FIG. 3 shows a slider 26 in accordance with the present invention, disc opposing face up. Depth on the disc opposing face is considerably exaggerated in FIG. 3 to show detail The slider 26 includes an inactive rail 60 and an active rail 62 shaped differently from the inactive rail 60. The most prominent difference between the active rail 62 and the inactive rail 60 is the inclusion of a hook portion 64 at the end of the active rail 62, such that the active rail 62 is "hockey" shaped like a hockey stick, or "L" shaped.

The slider 26 is generally mounted for flying at a slight negative roll such that the active rail 62 flies slightly lower than the inactive rail 60. In the preferred arrangement, the slider 26 is mounted such that active rail 62 is the outside rail or at a greater radius than the inactive rail 60. Workers skilled in the art will appreciate that a slider having mirror image of the design shown in FIG. 3 may be used when mounted on an opposite side of the disc 22, thus maintaining the hockey stick shaped active rail 62 at the greater radius (and slightly greater wind speed) on the disc 22. Workers skilled in the art will similarly appreciate that the mirror image would be used if the disc 22 was rotated in the opposite direction.

The slider 26 has a length and a width selected based on the desired flying characteristics and on manufacturing convenience. For instance, the slider 26 may be about 82 to 84 mils (approximately 2100 microns) long and about 60 to 62 mils (approximately 1550 microns) wide. The active rail 62 has an exterior or outside edge 66 and an interior or inside edge 68, and the inactive rail 60 has an outside edge 70 and an inside edge 72. The outside edges of both rails preferably extend longitudinally in a straight line. In contrast to the outside edges 66, 70, the inside edges 68, 72 of both rails 60, 62 have preferred nonlinear profiles.

The central cavity 50 may have a depth such as 0.2 mils (4.8 microns) relative to the air bearing surface of the rails 60, 62. There is no cross rail on the slider 26, so the cavity 50 will have a near-arnbient pressure during flying. The shape of the central cavity 50 is preferably defined by the shape of the inside edges 68, 72 of the active and inactive rails 62, 60.

The active rail 62 preferably includes a leading portion 74 and an intermediate portion 76 in addition to the hook portion 64. The leading portion 74 may include a taper 58, as shown in FIG. 3, or alternatively may include a step or other structure to pressurize the rail 62. The leading portion 74 is relatively thin, such as about 6.5 mil (165 microns) wide, and extends for about the first 20% of the slider length.

The leading portion 74 widens into the intermediate portion 76 over about the next 20% of the slider length. For instance, the inner edge may include an inward slope of less than 20°, or more preferably about 8°, relative to the longitudinal axis 56, as the active rail 62 widens.

The intermediate portion 76 is accordingly about 30% wider than the leading portion 74, such as a width of about 8.7 mil (220 microns). The intermediate portion 76 of the active rail 62 preferably continues for about another 45% of the slider length, such that the hook portion 64 occupies about the trailing 15% of the active rail 62. For instance, the intermediate portion 76 may extend longitudinally constant for about 40 mils (1015 microns).

Figure 4:
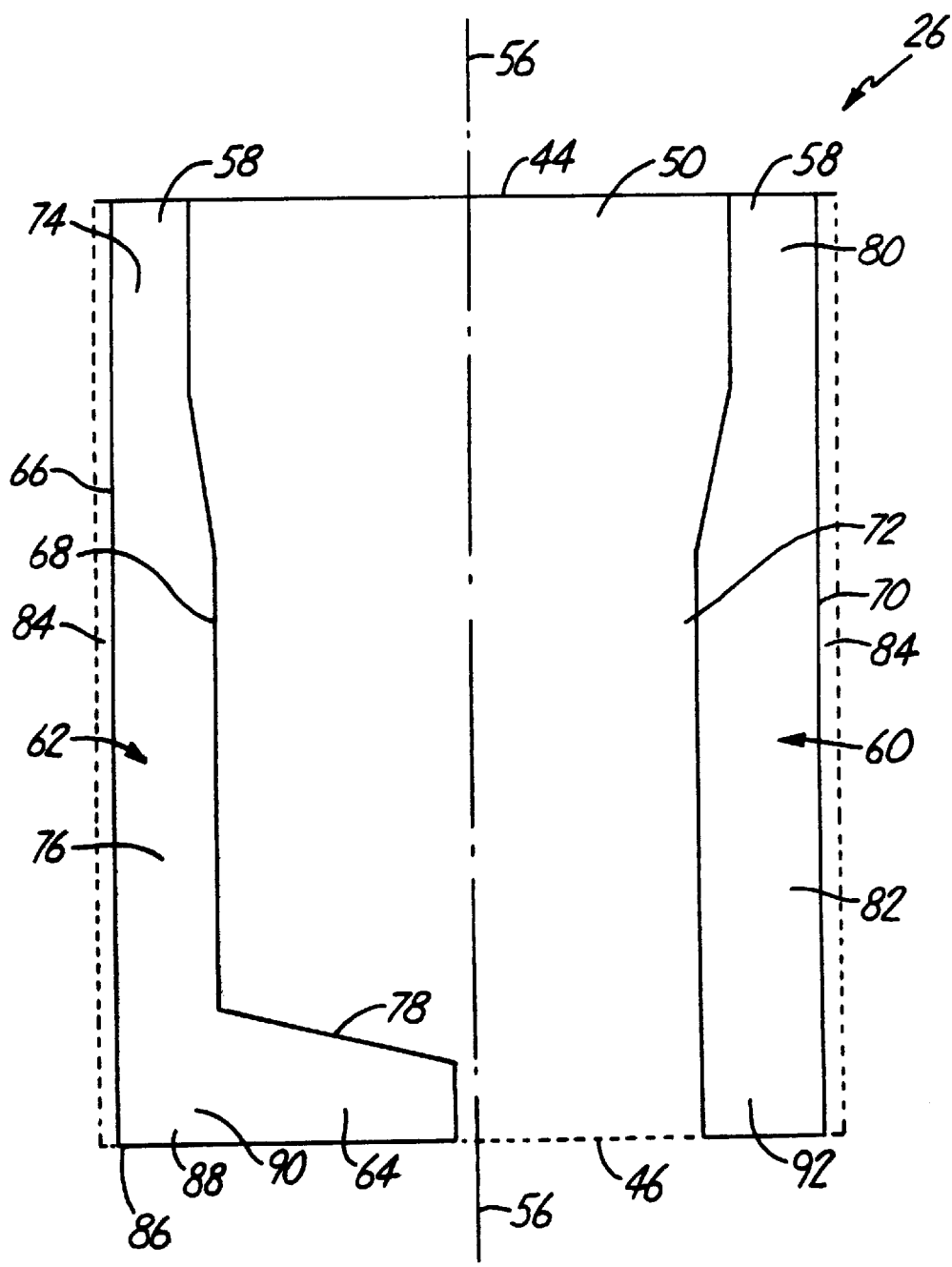
FIG. 4 is a plan view of the air bearing slider of FIG. 3.

The hook portion 64 extends inward to preferably cover at least about 25% of the slider width, to preferably have a width which is twice or more the width of the leading portion 74. More preferably the hook portion 64 extends over about 50% of the slider width, to a central location preferably along the longitudinal axis 56 of the slider 26. The width of the hook portion is preferable at least 15 mils or more, and more preferably 25 mils or more. The hook portion 64 has a front edge 78 which extends inwardly, preferably at an angle or about 45° or more to the longitudinal axis 56. The slope of the front edge 78 of the hook portion 64 is more preferably between about 60° and 90° to the longitudinal axis 56. For instance, in the preferred embodiment as depicted in FIG. 4, the slope of the front edge 78 of the hook portion 64 is at about 76° to the longitudinal axis 56.

The inactive rail 60 is also has a leading portion 80 which is relatively thin, but may be slightly wider than the corresponding leading portion 74 on the active rail 62. For instance, the leading portion 80 of the inactive rail 60 may have a width of about 7.5 mils (190 microns). Similar to the leading portion 74 on the active rail 62, the leading portion 80 of the inactive rail 60 may include a taper 58 and extend longitudinally constant for about the first 20% of the slider length.

After the leading portion 80, the inactive rail 60 widens to a trailing portion 82. For instance, the inside edge 72 may include a portion of inward slope of less than 20°, or more preferably about 110, relative to the longitudinal axis 56, as the inactive rail 60 widens over about the next 20% of its length.

The trailing portion 82 is accordingly about 40% wider than the leading portion 80, such as a width of about 10.5 mils (265 microns). The trailing portion 82 preferably extends longitudinally constant to the trailing edge 46 of the slider 26 over the trailing about 60% of the slider length. Alternatively, the trailing portion 82 of the inactive rail 60 may terminate slightly prior to the trailing edge 46 of the slider 26, such as having the inactive rail 60 extend over the first 88 to 94% of the slider length. For instance, the inactive rail 60 may be relieved from about 5 to 10 mils (from about 130 to 250 microns) from the trailing edge 46 of the slider 26.

A longitudinally extending step 84 is defined along the outside edge of both the active rail 62 and the inactive rail 60. The longitudinally extending step 84 ensures that the outside edges 66, 70 (and thus the widths) of the rails 62, 60 are defined in a photolithographic forming process in bar processing, rather than by the dicing process used to separate each air bearing slider 26 in a bar from neighboring air bearing sliders 26. The slider 26 preferably has a slight longitudinal crown lap across the air bearing surface, and preferably has no lateral crown lap.

The sliders 42, 26 of FIGS. 2 and 3 can be modeled for flying performance. Several locations shown in FIG. 4 can be defined on the disc opposing face of the air bearing slider 26 toward characterizing flying performance. The "lowest height" location "Hymn" 86 is the outside trailing corner of the slider 26, where the outside edge 66 of the active rail 62 intersects with the trailing edge 46. A "gap" location 88 is selected 6.25 mils (160 microns) inward and 1 mil (25 microns) in front of the lowest height location 86 of the trailing active corner. A "spot" or outer rail trailing end "ORTE" location 90 is selected 6.25 mils (160 microns) inward and 2.95 mils (75 microns) in front of the lowest height location 86. Similar to the spot or ORTE 90 but on the inactive rail 60, an inner rail trailing end "IRTE" location 92 is selected 6.25 mils (160 microns) inward and 2.95 mils (75 microns) from the intersection point of the trailing edge 46 and the outside edge 70 of the inactive rail 60.

TABLE 1 below shows modeled fly heights, roll angles and pitch angles of the preferred slider 26 of FIGS. 3 and 4, mounted at a preload force of 9.5 grams and a pivot offset of 20/0 mils.

TABLE 1

FLYING HEIGHTS

| DISC/WIND SPEED (ips) | Hmin ($\mu$") | GAP ($\mu$") | SPOT ($\mu$") | IRTE ($\mu$") | ROLL ($\mu$rad) | PITCH ($\mu$rad) |
|---|---|---|---|---|---|---|
| 400 | 0.70 | 0.85 | 1.10 | 1.30 | −4.1 | 147 |
| 450 | 0.84 | 1.00 | 1.29 | 1.46 | −3.6 | 169 |
| 500 | 0.98 | 1.17 | 1.50 | 1.64 | −2.8 | 192 |
| 550 | 1.15 | 1.35 | 1.73 | 1.82 | −1.8 | 216 |
| 600 | 1.34 | 1.56 | 1.99 | 2.01 | −0.4 | 242 |

Note that all of these flying heights are very small in comparison to the size of the slider 26, on the order of 1% of the depth of the central cavity, and on the order of 0.002% of the width of the slider 26. The pitch and roll angles are also very small in an angular sense, and the slider 26 flies very nearly parallel to the disc surface.

The flying height magnitudes are fairly sensitive to the preload force applied to the slider 26. For instance, the flying heights can be lowered by about a factor of 2 by doubling the preload force, and can be increased by about a factor of 2 by halving the preload force. Once a desired range of flying heights is selected, then the actuator arm 38 can be manufactured and the slider 26 mounted for an appropriate preload force.

Figure 5:
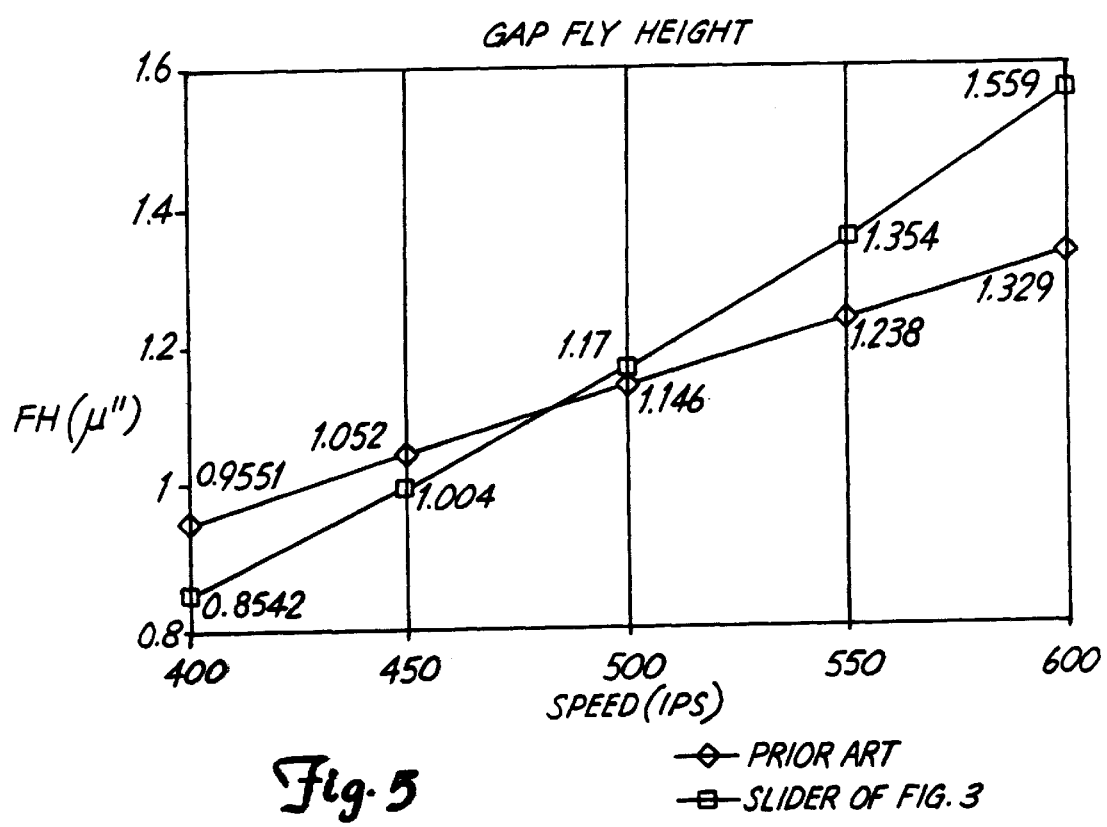
FIG. 5 is a graph of gap fly height versus speed as a function shown for both the sliders of FIG. 2 and FIG. 3.
Figure 6:
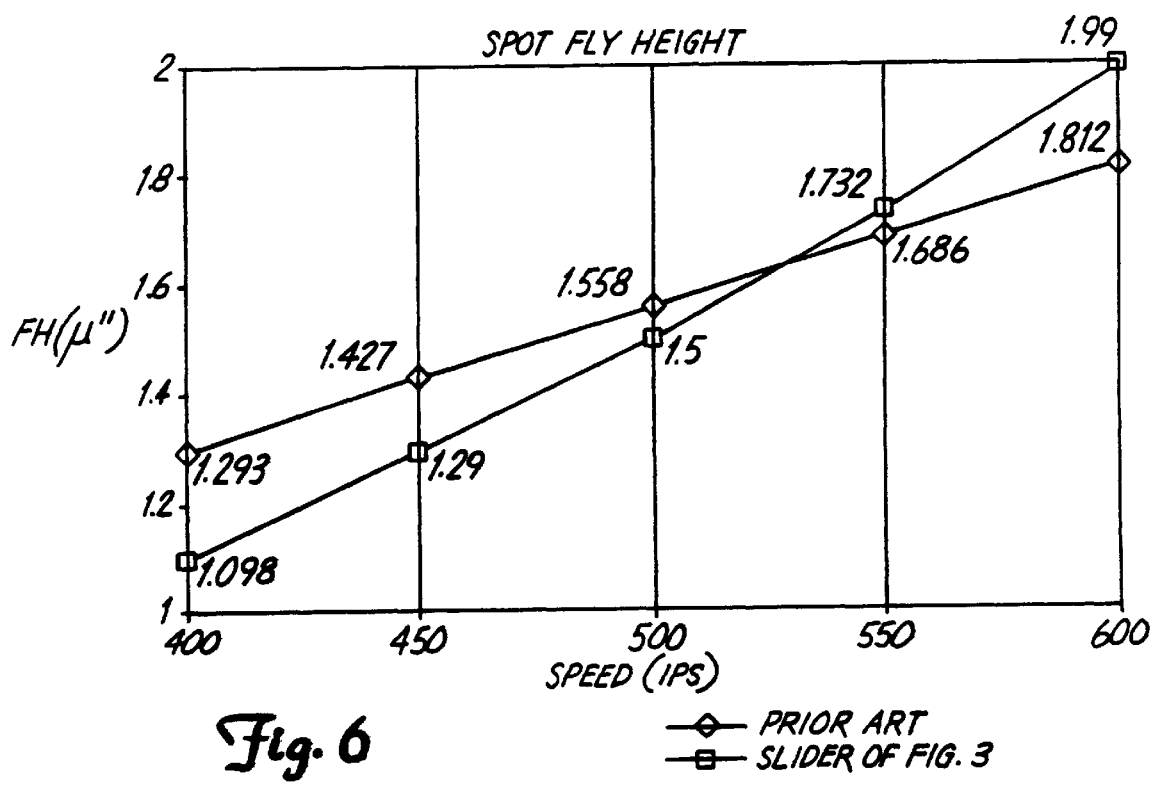
FIG. 6 is a graph of spot fly height as a function for both the sliders of FIG. 2 and FIG. 3.
Figure 7:
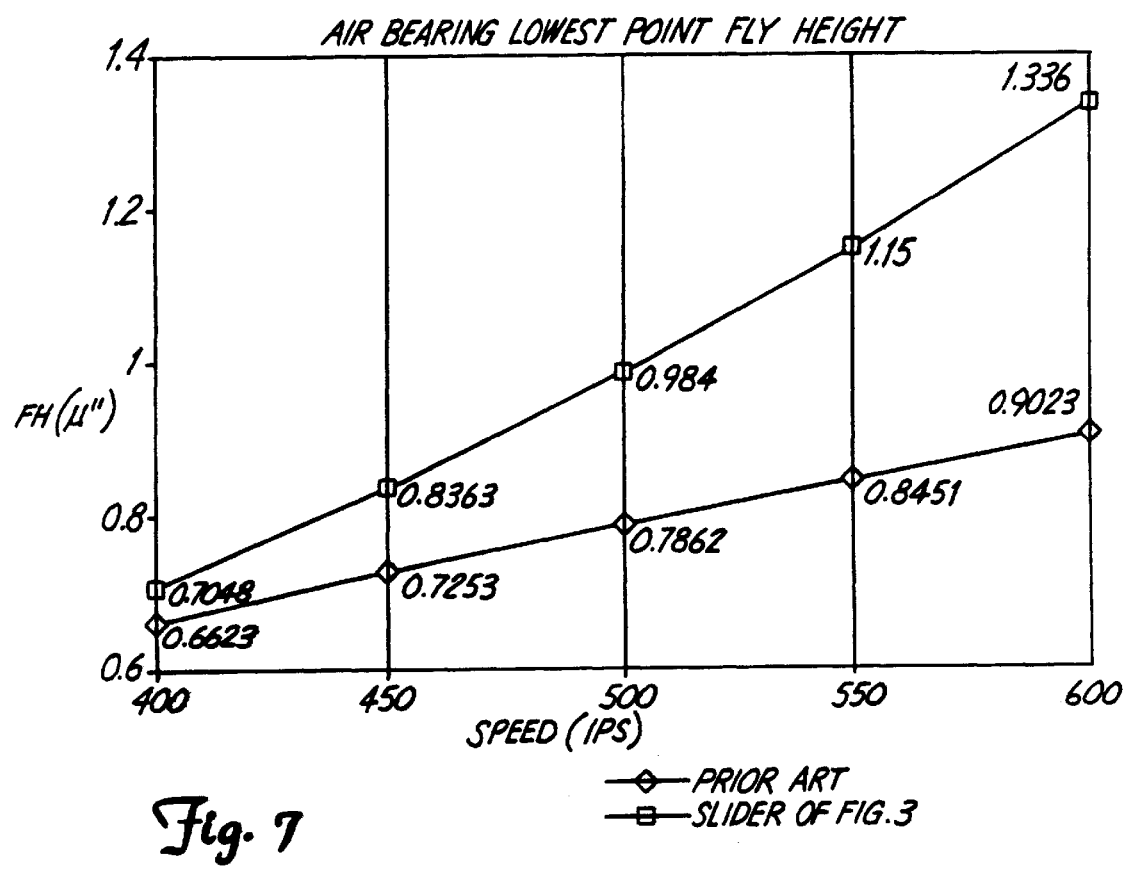
FIG. 7 is a graph of the lowest point fly height for both the sliders of FIG. 2 and FIG. 3.

Because the flying height magnitudes can be controlled through an appropriate preload force, the flying height magnitudes themselves are not as significant as the change in flying height based on the change in disc/wind speed. FIGS. 5–7 shows modeled fly heights as a function of disc/wind speed of the preferred slider 26 of FIGS. 3 and 4, as compared to the prior art catamaran slider 42 of FIG. 2. Of most importance, the change in flying height per change in disc/wind speed of the present invention (that is, the slope of the lines in FIGS. 5–7) is considerably greater for the present invention as compared to the prior art catamaran slider 42. The change in flying height per change in disc/wind speed is particularly important along the trailing portion of the active rail 62, where the glide slider 26 will contact or be vibrated by asperities on the disc 22 during glide testing, TABLE 2 below numerically shows ths difference between the prior art and the present invention by calculating "flying height speed sensitivities" at the various locations on the active rail 62. The flying height speed sensitivities are calculated as the percentage change in flying height based on a change of disc/wind speed from 400 to 600 ips, and also in Angstroms/ips change in disc/wind speed.

TABLE 2

FLYING HEIGHT SPEED SENSITIVITIES

| SLIDER | Hmin | Hmin (Å/$\Delta$ips) | GAP | GAP (Å/$\Delta$ips) | SPOT | SPOT (Å/$\Delta$ips) |
|---|---|---|---|---|---|---|
| Prior Art | 36% | 0.30 | 39% | 0.47 | 40% | 0.66 |
| FIGS. 3 and 4 | 91% | 0.80 | 84% | 0.90 | 81% | 1.13 |

It should be understood that the numbers given, even when using units of Angstroms/ips change in disc/wind speed, are merely modeled average slopes for flying height change over the change in disc/wind speed from 400 to 600 ips, and do not reflect differences in actual measured flying heights for the sliders at particular wind speeds. Actual measured results may vary from these calculated averages for any of a number of reasons.

The air bearing slider 26 of the present invention thus shows a first important advantage of significantly increased flying height speed sensitivity over the prior art. In contrast to sliders used in to support a read and/or write transducer in a disc drive, the slider 26 used in glide testing is preferred to have an increased sensitivity to wind velocity. The spindle motor allows the disc/wind speed to be controlled, but only over a range set by the motor and tester design, such as the 400 to 600 ips range discussed above. The increased flying height speed sensitivity of the present invention allows a wider range of selection of flying heights for glide testing.

The present invention preferably has a flying height speed sensitivity of 50% or more change for a disc/wind speed change of 400 to 600 ips, and more preferably to 75% or more change, at least at one, and more preferably at all three of the Hymn, gap and spot locations 86, 88, 90. The present invention preferably allows a flying height speed sensitivity of 0.5 Å/$\Delta$ips at least at the Hymn location 86. The present invention more preferably allows a flying height speed sensitivity of 0.8 Å/$\Delta$ips at least at one, and more preferably at all three of the Hmin, gap and spot locations 86, 88, 90.

The increase sensitivity to wind speed can be explained as follows. There are four pressure peaks on a catamaran air bearing slider 42 when flying. See for instance U.S. Pat. No. 3,823,416, incorporated by reference. Two pressure peaks are located at the front of the rails 48 just behind the taper 58, where the air is initially compressed under the rails 48 of the slider 42. In the middle of catamaran rails 48, the positive pressure is minimal, as the initial compressed air bleeds off the sides of the rails 48. Two pressure peaks are located at the trailing edge 46 of the slider 42. These trailing pressure peaks are believed to be due to a molecularly thin layer of air which continues to "stick" to the disc 22 despite the disturbance created by the air bearing slider 42.

By including the hook portion 64 on the trailing end area of the active rail 62, the pressure profile is considerably modified. The four pressure peaks of the catamaran slider 42 are believed to remain substantially unchanged, although the rails 60, 62 are thinner to provide less lift force from these four pressure peaks. The hook portion 64 can be thought of as adding an additional fifth pressure peak, or as significantly increasing the area and magnitude of the active trailing corner pressure peak The hook portion 64 interacts with wind that is in the cavity 50, and is believed to generate pressure through both of the previously mentioned pressure phenomena: ie., both due to an initial compression of the relatively uncompressed air traveling through the cavity 50, and due to the molecularly thin layer of air stuck to the disc 22. The hook portion 64 may also create a third pressure phenomenon by "trapping" air in front of the hook portion 64 and within the cavity 50, slightly increasing the pressure on the cavity surface. As speed increases, the amount of "trapped" air in the cavity 50 may increase, increasing both the areal size and the magnitude of the pressure on the cavity surface. With these three phenomena created by the hook portion 64 all contributing to the pressure profile of the slider 26, the present invention is more sensitive to disc/wind speed than the prior art catamaran slider 42.

A second benefit of the present invention is that the active trailing rail width is increased. With the increased active trailing rail width, an asperity can be detected over a wider area of the slider 26. Assuming that it is still desired to ensured that each defect pass under the active rail 62 for four consecutive sweeps, the glide slider 26 of the present invention can be accessed at a scan increment of 29 mil trailing width/4 passes=7 mils. This 7 mil scan increment is significantly greater than the 3 mil track increment required by the prior art catamaran slider 42, while still maintaining the same defect detecting frequency. The 7 mil scan increment allows the 800 to 1875 flyable radii disc to be scanned in 154 revolutions, as compared to 358 revolutions required by the prior art, resulting in a time savings of 57% per scan.

Negative roll is preferred in glide sliders 26, 42 in order to keep the active rail 62, 48 closer to the disc 22. Too much negative roll will raise the trailing portion of the inside edge 68, 52 of the active rail 62, 48 too high to effectively sweep for asperities. The slider 26 provides nearly zero but slightly negative roll under typical spindle speed ranges. The slight negative roll is believed to be caused by the inactive rail 60 being wider than the active rail 62 along most of its length (prior to the hook portion 64). This widening of the inactive rail 60 slightly overcompensates for the tendency toward positive roll caused by the hook portion 64. The present invention thus preferably provides a negative roll at 400 to 600 ips, more preferably a negative roll between about 0 and −100 $\mu$rad, even more preferably a negative roll between about 0 and −10 $\mu$rad, and most preferably a negative roll between about 0 and −4 $\mu$rad.

The air bearing slider 26 of the present invention flies at a significantly low pitch angle regardless of wind speed. The low pitch angle is believed to make the air current flow around smaller asperities more significant in the overall flying performance of the slider 26, and thus the low pitch angle increases the sensitivity of the slider 26 to non-contact vibrations caused by asperities on the disc surface.

Although the present invention has been described with reference to preferred embodiments, workers skilled in the art will recognize that changes may be made in form and detail without departing from the spirit and scope of the invention. As one example, the outside edge 66, 70 of either or both rails 62, 60 could have a contour which changes longitudinally or otherwise compliments the contours on the inside edges 68, 72 of the rails 62, 60. As another example, the slider could be mounted for slightly positive roll and the inside rail could be the active rail as alternative to the outside rail active structure described herein. As a third example, while the present invention has been described with reference to production glide testing of magnetic discs for use in disc drives, the air bearing slider 26 of the present invention could be equivalently used in testing smoothness of any structure rotatable at relatively high speeds. Additionally, the present invention has applications even beyond glide testing, for use whenever an air bearing slider with increased flying height speed sensitivity is desired. For example, the present invention could be used in production writing of discs, or at other times when the rotational speed of the disc can be varied inversely to the radius of the slider, so the air speed velocity of the slider is controllable.

What is claimed is:

1. An air bearing slider for a disc testing apparatus comprising:
    an air bearing slider body having a disc opposing face bounded by a leading edge, a trailing edge opposite the leading edge, and side edges running from the leading edge to the trailing edge, the side edges intersecting the leading edge at leading corners, the side edges intersecting the trailing edge at trailing corners; and
    means for increasing the fly height sensitivity of the slider body relative to the speed of an underlying disc surface.

2. The air bearing slider of claim 1, wherein the slider body has a longitudinal axis running from the leading edge to the trailing edge between the side edges, and wherein the means for increasing fly height sensitivity comprises:
    an air bearing surface defined on the disc opposing face, the air bearing surface comprising:
        a first rail running longitudinally from the leading edge toward the trailing edge; and
        a second rail running longitudinally from the leading edge to the trailing edge, the second rail having a leading width at the leading edge and a trailing width at the trailing edge, wherein the trailing width is greater than the leading width;
    wherein the air bearing surface is nonsymmetrical with respect to the longitudinal axis.

3. The air bearing slider of claim 2 wherein the second rail is separated from the first rail by a cavity of near ambient or positive pressure.

4. The air bearing slider of claim 2, wherein the trailing width is provided by a hook portion occupying a trailing portion representing about 15% in length of the second rail such that the second rail has an "L" shape.

5. The air bearing slider of claim 2, wherein the trailing width of the second rail is at least about twice the leading width of the second rail.

6. The air bearing slider of claim 2, further comprising a vibration sensor mounted to the slider body.

7. The air bearing slider of claim 2, wherein the trailing edge defines a slider body width, and wherein the trailing width of the second rail is at least about one third of the slider body width.

8. The air bearing slider of claim 2 mounted on a testing apparatus for a disc, the testing apparatus comprising:
    a spindle for rotating a disc; and
    an actuator arm extendable across a surface of a disc rotated by the spindle, the actuator arm supporting the air bearing slider.

9. The air bearing slider of claim 8, wherein the air bearing slider further comprises a vibration sensor disposed adjacent the second rail, and wherein the air bearing slider maintains a positive pitch and a negative roll during accessing across the surface of the disc.

10. The air bearing slider of claim 2 wherein the air bearing slider having a flying height sensitivity relative to the underlying disc speed of 50% or more change for a disc/wind speed change of 400 to 600 ips.

11. The air bearing slider of claim 2 wherein the air bearing slider has a flying height sensitivity relative to the underlying disc speed of at least about 0.5 Å/Δips.

12. The air bearing slider of claim 2 wherein the second rail has an inside edge with a sloped portion extending at a non-perpendicular angle to the longitudinal axis.

13. An air bearing slider comprising:

an air bearing slider body having a disc opposing face bounded by a leading edge, a trailing edge opposite the leading edge, and side edges running from the leading edge to the trailing edge, the side edges intersecting the leading edge at leading corners, the side edges intersecting the trailing edge at trailing corners, and a longitudinal axis running from the leading edge to the trailing edge between the side edges;

an air bearing surface defined on the disc opposing face, the air bearing surface comprising:

a first rail running longitudinally from the leading edge toward the trailing edge; and a second rail running longitudinally from the leading edge to the trailing edge, the second rail having a leading width at the leading edge and a trailing width at the trailing edge, wherein the trailing width is greater than the leading width and wherein the second rail has an inside edge having a front portion disposed at an angle of less than about 45° relative to the longitudinal axis and a rear portion downstream from the front portion disposed at an angle of at least about 45° to about 90° to the longitudinal axis.

14. The air bearing slider of claim 13, wherein the side edges include first and second side edges;

wherein the first rail runs longitudinally along the first side edge; and wherein the second rail runs longitudinally along the second side edge and is separated from the first rail by a cavity without a crossbar.

15. The air bearing slider of claim 14, wherein the trailing width of the second rail is at the trailing edge of the slider body.

16. An air bearing slider comprising:

an air bearing slider body having a disc opposing face bounded by a leading edge, a trailing edge opposite the leading edge, and side edges running from the leading edge to the trailing edge, the side edges intersecting the leading edge at leading corners, the side edges intersecting the trailing edge at trailing corners, and a longitudinal axis running between the side edges;

an air bearing surface defined on the disc opposing face, the air bearing surface comprising:

a first rail running longitudinally from the leading edge toward the trailing edge, the first rail comprising:

a leading portion having a leading width at the leading edge;

an intermediate portion downstream from the leading portion, the intermediate portion extending longitudinally with a generally constant intermediate width which is greater than the leading width; and a trailing portion downstream from the intermediate portion, the trailing portion having a trailing width at the trailing edge which is greater than the intermediate width; and a second rail running longitudinally from the leading edge to the trailing edge.

17. The air bearing slider of claim 16, wherein the second rail has a second rail trailing portion extending longitudinally with a constant second rail trailing width at the trailing edge which is greater than the intermediate width of the first rail and less than the trailing width of the first rail.

* * * * *